(12) United States Patent
Karwowski et al.

(10) Patent No.: US 7,867,537 B2
(45) Date of Patent: Jan. 11, 2011

(54) PRODUCTION OF SNACKS HAVING AN EXPANDED, CRISPY, CHIP-LIKE TEXTURED COATING

(75) Inventors: Jan Karwowski, Franklin Lakes, NJ (US); C. Y. (Eric) Wang, Morris Plains, NJ (US); Randy G. Young, Wayne, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1392 days.

(21) Appl. No.: 10/264,561

(22) Filed: Oct. 4, 2002

(65) Prior Publication Data

US 2004/0067282 A1  Apr. 8, 2004

(51) Int. Cl.
*A23L 1/10* (2006.01)
(52) U.S. Cl. ............... 426/303; 426/93; 426/94; 426/293; 426/295; 426/296; 426/305
(58) Field of Classification Search .......... 426/93, 426/94, 293, 294, 295, 296, 302, 303, 305
See application file for complete search history.

(56) References Cited

U.S. PATENT DOCUMENTS

| | | |
|---|---|---|
| 2,859,121 A | 11/1958 | Avera |
| 3,787,588 A | 1/1974 | Turitz |
| 4,053,650 A | 10/1977 | Chino et al. |
| 4,209,536 A | 6/1980 | Dogliotti |
| 4,499,113 A | 2/1985 | Mochizuki et al. |

(Continued)

FOREIGN PATENT DOCUMENTS

EP     0841012 A1    5/1998

(Continued)

OTHER PUBLICATIONS

Kuipers Food Processing Machinery, Designing, Engineering, Manufacturing, Commissioning, Nut Coating, Flour and Dough Coating, Coating with Batter, 2 pages from website, www.Kuipers.nu.

(Continued)

*Primary Examiner*—Lien Tran
(74) *Attorney, Agent, or Firm*—Greenblum & Bernstein, P.L.C.

(57) ABSTRACT

A savory or sweet snack having an expanded, crispy, chip-like textured, substantially uniform, homogeneous, cellular coating is obtained by tumbling an edible core material, such as nuts or dried fruit, and alternately applying an aqueous component and a preblended dry mixture on the tumbling edible core material to form a dough coating on the edible core material. The dough-coated core material may be heated by frying or baking to substantially reduce the moisture content of the dough, and to substantially expand the dough. The thick, expanded coating has a substantial amount of wheat yet it possesses a crispy, crunchy texture of a chip, rather than a leavened, mealy or flaky texture. Use of a pregelatinized waxy starch, which is not chemically modified, provides crispness and a high degree of expansion Use of a pure, raw potato starch which is not chemically modified promotes crunchiness and a chip-like texture and reduces oil pick-up or absorption during frying. The tumbling is preferably performed in a continuous belt coating device to achieve high production rates and uniform coating of individual core material pieces without agglomeration or sticking of pieces to each other.

41 Claims, 4 Drawing Sheets

U.S. PATENT DOCUMENTS

| | | | |
|---|---|---|---|
| 4,560,569 A | 12/1985 | Ivers | |
| 4,613,508 A | 9/1986 | Shishido | |
| 4,752,493 A | 6/1988 | Moriki | |
| 4,834,996 A | 5/1989 | Fazzolare et al. | |
| 4,873,093 A | 10/1989 | Fazzolare et al. | |
| 4,913,919 A | 4/1990 | Cornwell et al. | |
| 4,931,303 A | 6/1990 | Holm et al. | |
| 4,994,295 A | 2/1991 | Holm et al. | |
| 5,000,968 A | 3/1991 | Szwerc et al. | |
| 5,080,914 A * | 1/1992 | Birch et al. | 426/93 |
| 5,188,855 A | 2/1993 | Bernacchi et al. | |
| 5,362,505 A | 11/1994 | Hsieh et al. | |
| 5,405,625 A | 4/1995 | Biggs | |
| 5,429,834 A | 7/1995 | Addesso et al. | |
| 5,433,961 A | 7/1995 | Lanner et al. | |
| 5,500,240 A | 3/1996 | Addesso et al. | |
| 5,571,546 A | 11/1996 | Kristinus et al. | |
| 5,747,092 A | 5/1998 | Carey et al. | |
| 5,964,146 A * | 10/1999 | Kelly et al. | 99/467 |
| 5,980,967 A | 11/1999 | Carey et al. | |
| 5,997,918 A * | 12/1999 | Melvej | 426/102 |
| 6,558,722 B2 * | 5/2003 | Corriveau et al. | 426/293 |
| 6,638,550 B2 * | 10/2003 | Banko et al. | 426/231 |
| 6,644,237 B2 | 11/2003 | Rooke | |
| 2005/0053708 A1 | 3/2005 | Mihalos et al. | |

FOREIGN PATENT DOCUMENTS

| | | |
|---|---|---|
| WO | WO 99/34691 | 7/1999 |

OTHER PUBLICATIONS dtg Engineering, Product Range, Confection Equipment, 2 pages from website, www.dtg-ltd.co.uk.

* cited by examiner

PRODUCTION OF SNACKS HAVING AN EXPANDED, CRISPY, CHIP-LIKE TEXTURED COATING

FIELD OF THE INVENTION

The present invention relates to the production of baked or fried snacks having an edible core, such as peanuts, which are coated with an expanded, chip-like crispy textured coating.

BACKGROUND OF THE INVENTION

In the production of baked snacks from a dough, such as a wheat-based dough, generally the thinner the dough the more chip-like is the baked snack in crispness and appearance. However, to produce a substantially expanded, thick, coating on an edible core material, such as a peanut, expansion or leavening of a wheat-based dough tends to result in a lamellar structure with generally uniform small cells and a tender, mealy, leavened texture, rather than a crisp, chip-like texture. Upon mastication, a conventional wheat-based cracker generally disperses more rapidly than does a chip. Conventional wheat-based cracker doughs do not provide a crunchy texture and a sensation of breaking into pieces with low molar compaction before dispersion as does a chip.

Filled baked crackers or snacks obtained by needle injection of fillings into hollow expanded snacks made from wheat flour are disclosed in U.S. Pat. No. 4,209,536 to Dogliotti, U.S. Pat. No. 4,613,508 to Shishido, U.S. Pat. No. 4,752,493 to Moriki, and U.S. Pat. No. 5,000,968 to Szwerc et al. The doughs are formulated and processed to retain a puffed or pillowed shape after piercing of the baked, hollow piece.

The production of chip-like, starch-based snacks having a crispy texture and surface blisters from starch-based compositions which have little or no gluten, such as potato flour or corn flour, is disclosed in U.S. Pat. Nos. 4,873,093 and 4,834,996 to Fazzolare et al. and U.S. Pat. Nos. 5,429,834 and 5,500,240 to Addesso et al. Starch-based compositions which have little or no gluten, when mixed with water, do not form a dough that is cohesive at room temperature and continuously machinable or sheetable. Machinability of doughs made from ingredients having little or no gluten may be improved by forming a dough under elevated temperature conditions, such as by steaming the ingredients, as disclosed in U.S. Pat. Nos. 4,873,093 and 4,834,996 to Fazzolare et al.

In the process of U.S. Pat. Nos. 5,429,834 and 5,500,240 to Addesso et al, use of a pregelatinized waxy starch provides for the production of cohesive, extensible, continuously machinable doughs from starchy materials or ingredients having starch with no or low gluten. These machinable doughs may be formed at room temperatures without the need for steaming or heat treatment to develop cohesiveness, extensibility, and machinability.

U.S. Pat. Nos. 4,931,303 and 4,994,295 to Holm et al disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch), and the concentration of any starch-complexing emulsifiers present. In the Holm et al process, a dough may be formed comprising, e.g., potato solids or corn solids, raw or pregelatinized starches, modified starches, flavorings, oils, and the like.

U.S. Pat. No. 4,560,569 to Ivers discloses that in the production of a dough-based fried food product, a processed starch in either gelatinized or ungelatinized form is frequently added when a low-starch flour or flake is employed. Water, it is disclosed, is required to soften the flour, and depending upon the protein content of the flour, to form a network of protein (gluten), which is the framework of the product. According to Ivers, starch, which is present in flours, is used as a binder and is required for the unleavened product to expand upon frying. Dough stickiness and hardness of the cooked product may be controlled by the addition of oil to the dough to control the extent of the protein framework. The dough is prepared by adjusting the ratios of components and the mixing time to allow it to sheet uniformly at the desired thickness without sticking or tearing. According to Ivers, addition of a small amount of a lecithin-in-water suspension to the formulation of the dough-based fried snack foods improves the transfer, sheeting and cutting, and significantly reduces clumping during frying, without the rapid buildup of free fatty acids and without significant darkening of frying oil, normally associated with the frying of foods containing lecithin.

U.S. Pat. Nos. 5,747,092 and 5,980,967 each to Carey et al disclose that in the production of wheat-based baked snacks the inclusion of a pregelatinized starch in the dough to create surface bubbles tends to result in a styrofoam-like or compressible texture, rather than a highly crisp, crunchy texture. Also, if the pregelatinized starch is not sufficiently hydrated prior to baking, bubbles created during baking tend to collapse. A pregelatinized potato starch, which is also activated (i.e. sufficiently hydrated) prior to baking, is employed to reduce or control bubbling and to avoid a styrofoam-like texture. Sufficient hydration of the pregelatinized waxy starch and pregelatinized potato starch is achieved by premixing them with hot water or by providing sufficient dough lay time for hydration to occur.

The production of snack products having a non-expanded coating for imparting a crunchy or crispy texture to a comestible is disclosed in U.S. Pat. No. 4,913,919 to Cornwell et al and U.S. Pat. No. 5,362,505 to Hsieh et al. A high solids, aqueous coating composition having from 10% to 40% by weight maltodextrin and from 10% to 40% by weight starch granules is employed to modify the texture, flavor and/or color of comestible products such as cookies, corn chips, potato chips, and puffed corn snacks in the process of U.S. Pat. No. 4,913,919. In the process of U.S. Pat. No. 5,362,505 individual, crunch-confectionery-coated edible nuts are produced by first coating unblanched, raw nuts with a film-forming polysaccharide to maintain the skins adhered to the nuts in a durable polysaccharide coating. The coated nuts are then coated in a pan coater with a sucrose syrup, followed by heating to remove moisture and to thereby form a crystalline coating. The crystalline coating is then partially melted to form a crystalline-amorphous coating on top of the polysaccharide coating on the individual nuts.

U.S. Pat. No. 5,188,855 discloses coating of an expanded snack, such as a cheese ball, with a batter and bread crumbs, and then baking and frying it. Expansion of the coating into a crisp, chip-like texture is not disclosed.

A process for applying breadcrumbs to nuts is also disclosed in European Patent Application Publication No. EP 0841012 A1 to Zwiekhorst, published May 5, 1998. A paste layer of flour is applied to the nuts by means of spraying liquid, an adhesive layer is applied, and then breadcrumbs are applied. The coated products may then be fried or roasted in hot air. Expansion of the coating into a crisp, chip-like texture is not disclosed.

U.S. Pat. No. 3,787,588 to Turitz discloses preparing a snack food by wrapping a nut with a thin shell of a dough comprising a mixture of 85-35% by volume wheat flour and 15-65% by volume corn flour so that the dough contacts the skin of the nut and then baking or frying the dough wrapped nut. The dough, it is disclosed, forms a hard, crunchy, crisp crust.

The production of snack products with an expanded coating on a comestible, such as nuts, is disclosed in U.S. Pat. No. 4,053,650 to Chino et al, U.S. Pat. No. 4,499,113 to Mochizuki et al, U.S. Pat. No. 5,433,961 to Lanner et al, U.S. Pat. No. 5,571,546 to Kristinus et al, and PCT International Patent Publication No. WO 99/34691 to Kreuning et al.

In the process of PCT International Patent Publication No. WO 99/34691 a batter resembling pancake batter containing water, wheat flour, and possibly other starches or flours is used to coat nuts. One or more particles are provided on the layer which is still wet so that a part of the particles projects from the coating layer, and then the coated product is deep fried. For obtaining a highly expandable dough material, it is disclosed, a pregelatinized waxy maize flour, native waxy maize flour, and pregelatinized sticky rice flour may be employed. However, use of a batter to the coat nuts tends to result in agglomeration or sticking of individual nuts to each other, and non-uniform coating of the nuts.

U.S. Pat. No. 4,053,650 to Chino et al discloses the production of puffed confections in which leguminous seeds, nuts or other food particles are incorporated which have a uniform shape. The food particles are coated in a revolving pan alternately with an edible flour composition and an aqueous solution of a sugar, syrup or gum. The flour composition contains a self non-expandable cereal flour or starch such as wheat flour or rice flour or a starch such as potato starch or corn starch, and a self-expandable cereal flours or starches such as alpha-waxy maize starch or alpha-waxy rice flour. The coated pieces are baked in a mold, and an open space is created within the baked shell so that the piece is moveable within it. The moisture content of the coated layer must be no more than 23% when the articles are baked because the expansion strength of the flour composition and the excessive pressure of the steam vapor force the steam and gelatinized paste compositions of the coated layer out of the mold. Use of a pregelatinized waxy starch to achieve uniform expansion without a baking mold is not disclosed.

U.S. Pat. No. 4,499,113 to Mochizuki et al discloses that "Onorokemame" is a Japanese snack product conventionally made from a formulation that contains mainly wheat flour and a large amount of expandable pregelatinized starchy flour such as pregelatinized waxy corn flour or pregelatinized glutinous rice flour that expands with heat to provide a fully expanded product. According to Mochizuki et al the conventional product does not possess full savor because a starchy flour which is less expandable but provides good savor, such as mashed potato flour and corn flour is not employed. In the process of Mochizuki et al, coating a core material with a layer of starchy flour that has a single degree of expandability as in the conventional product, results in difficulty in controlling the expansion of the coating during heating and difficulty in attaining a suitable degree of hardness. In the Mochizuki et al process and composition, an expanded coating is obtained with a starchy flour formulation that contains a smaller amount of highly expandable pregelatinized starchy flour, such as pregelatinized waxy corn flour and pregelatinized glutinous rice flour, and 50 to 77.5% by weight, based on the total starchy flour, of less expandable starchy flour such as mashed potato flour and corn flour. However, the starchy flour formulation is applied using two coatings, each coating comprising a mixture of two different types of starchy flour. The second coating is less expandable than the first coating. Wheat flour is not employed in either coating. Also, use of a high amount of corn flour tends to reduce crunchiness, and imparts a corn flavor. Use of high amounts of a mashed potato flour rather than a raw potato starch tends to result in a tighter, harder texture.

Use of a second coating which is less expandable than a first coating is also disclosed in U.S. Pat. No. 5,571,546 to Kristinus et al. Kristinus et al discloses food products having a comestible core, such as nuts, surrounded by coating compositions containing a mixture of linear and branched polysaccharides. The polysaccharide mixture is provided by a mixture of waxy and non-waxy starches. A major proportion of non-pregelatinized waxy starch is employed in a first layer to obtain an expanded or puffed layer having a flaky texture. A second layer which comprises a major proportion of a non-waxy starch, such as wheat flour, provides a hard, protective outer shell. Use of a pregelatinized waxy starch in place of the non-pregelatinized waxy starch, it is disclosed, would not result in the desired flaky texture.

U.S. Pat. No. 5,433,961 to Lanner et al discloses the continuous production of non-aggregated edible cores, such as nuts, with crisp farinaceous coatings. A farinaceous powder is continuously dusted on the dry zone of a tumbling bed of edible cores. As the edible cores repeatedly rotate through both the wet and dry zones, they are repeatedly coated by the farinaceous powder in the dry zone and hydrating liquid in the wet zone thereby forming farinaceous dough around the individual edible cores. The farinaceous powder contains flour, preferably from about 20 to 100%, more preferably from about 35 to 95% by weight of flour. The farinaceous powder further comprises from about 0 to 50%, more preferably from about 5 to 40% by weight of pregelatinized starch. The pregelatinized starch is preferably a pregelatinized modified waxy starch. Flours which may be used in the dusting step include nut flour and cereal grain flours derived from wheat, rice, oats, corn, barley, rye or mixtures thereof. The farinaceous dough coating formed on the individual edible cores, it is disclosed, must contain a flour and starch to sugar weight ratio of from about 0.5:1 to 30:1, preferably from about 1.5:1 to 10:1 to obtain a crisp texture of the coated snack product. The use of a pregelatinized non-modified waxy starch or the use of a raw potato starch, to obtain a crispy, chip-like texture in expanded coatings is not disclosed.

In the present invention, a snack having an expanded, crispy, chip-like textured coating which contains a substantial amount of wheat flour is obtained using a highly expandable, pregelatinized waxy starch and a raw potato starch. Thick, uniformly expanded, cellular coatings having a crispy, chip-like texture are achieved in a single, homogeneous coating or layer and without the need for a baking mold. An expandable, adherent, dough coating is formed on an edible core material, such as a nut or dried fruit, without substantial or any agglomeration or sticking of individually coated core material pieces to each other. The dough coating may be expanded by frying or baking to obtain savory or sweet snack products having a substantially expanded, crispy, chip-like coating or casing.

SUMMARY OF THE INVENTION

A savory or sweet snack having an expanded, crispy, chip-like textured coating is obtained by tumbling an edible core material, such as nuts or dried fruit, and alternately applying an aqueous component and a preblended dry mixture on the tumbling edible core material to form a dough coating on the edible core material. The tumbling is preferably performed in a continuous belt coating device to achieve high production rates and uniform coating of individual core material pieces without agglomeration or sticking of pieces to each other.

The preblended dry mixture comprises about 10% by weight to about 60% by weight, preferably from about 20% by weight to about 40% by weight of a pregelatinized waxy starch, about 10% by weight to about 70% by weight, preferably from about 35% by weight to about 60% by weight of a wheat flour component, and about 2% by weight to about 30% by weight, preferably from about 5% by weight to about 20% by weight of a raw potato starch, the percentages being based upon the weight of the preblended dry mixture.

Use of a pregelatinized waxy starch, which is not chemically modified, provides crispness and a higher degree of expansion compared to the use of a pregelatinized non-modified waxy starch or a waxy starch which is not pregelatinized. Use of a pure, raw potato starch which is not chemically modified promotes crunchiness and a chip-like texture and reduces oil pick-up or absorption during frying.

In preferred embodiments, the aqueous component is pure water, and any sugars which are employed are included with the preblended dry mixture for more accurate control of the dough composition and reduced stickiness.

The dough-coated core material may be heated by frying or baking to substantially reduce the moisture content of the dough, to substantially gelatinize the starch in the wheat flour component, and to substantially expand the dough. The expanded dough-coated core material may then be cooled to obtain individual pieces having a core material coated or encased in an expanded, substantially uniform, homogeneous, cellular coating or casing which has a crispy, chip-like texture. The weight of the expanded, crispy chip-like coating may be from about 30% by weight to about 70% by weight, preferably from about 40% by weight to about 60% by weight, based upon the total weight of the expanded chip-like coating and the edible core material.

BRIEF DESCRIPTION OF THE DRAWINGS

The present invention is further illustrated by the accompanying drawings wherein.

DETAILED DESCRIPTION OF THE INVENTION

Figure 1:
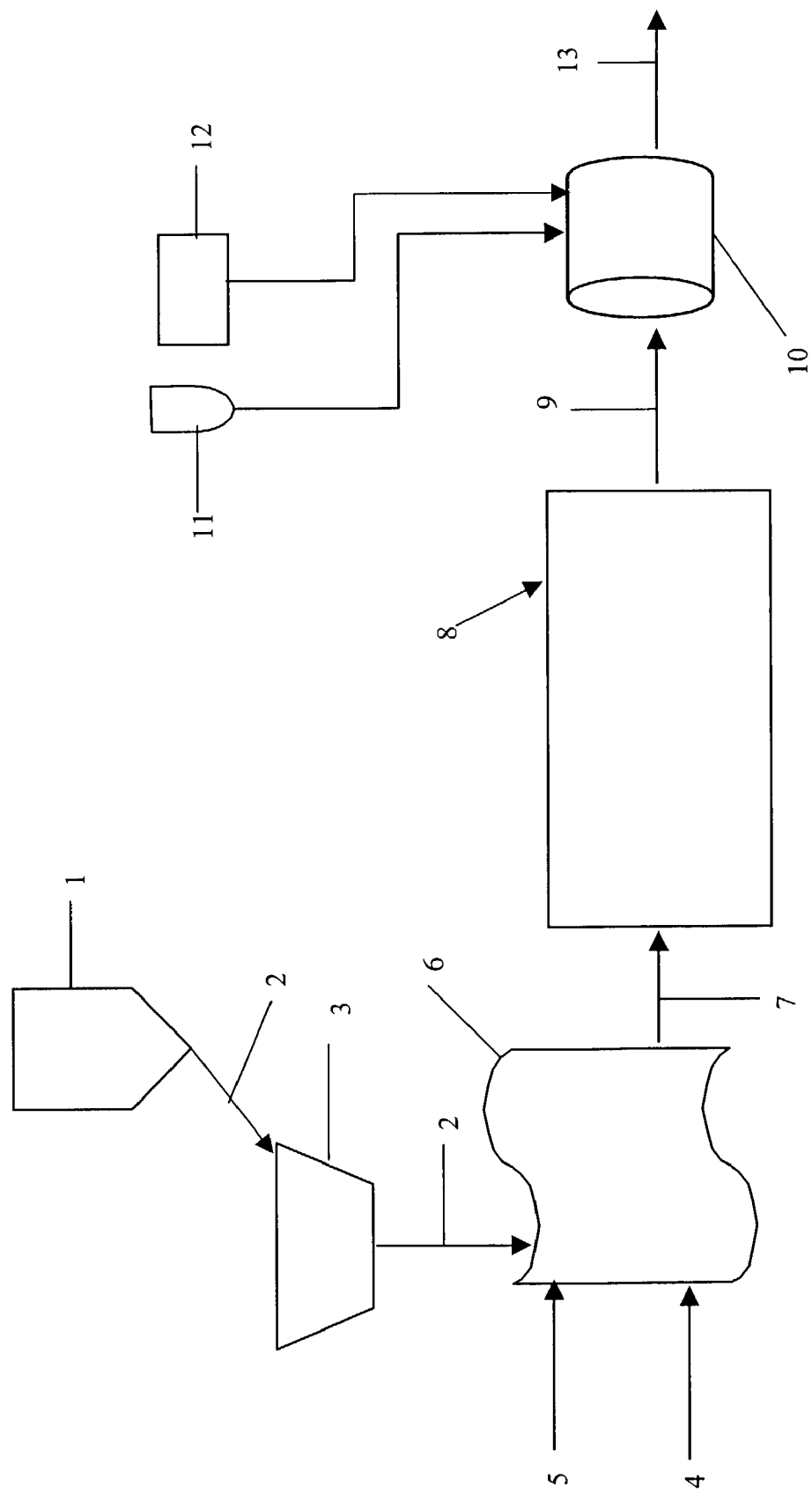
FIG. 1 schematically shows a method for making a fried, expanded, and crispy snack according to the present invention.

The coated snacks of the present invention include savory and sweet products and they may be fried or baked. The substantially expanded coating has a substantial amount of wheat yet it possesses a crispy, crunchy texture of a chip, rather than a leavened, mealy or flaky texture. The expanded, crispy, chip-like texture coatings have a substantially uniform, cellular structure. The outer surfaces of the snack coating are generally smooth with no blisters or bubbles formed on the outer surfaces of the coating. In preferred embodiments of the invention, no large air pockets or bubbles are present below the outer surface of the snack, within the coating layer. However, in other embodiments, one or more large bubbles or air pockets may be present within the smooth surfaced coating layer. In embodiments of the invention, the expanded snack coating itself may exhibit a breaking force of about 1500 gm to about 3000 gm, preferably from about 2,000 gm to about 2,700 gm as measured by a conventional TAXT2 or Stevens texture meter having a 1.6 mm probe. The thickness of the expanded, at least substantially homogeneous coating may range from about 2 mm to about 8 mm, preferably from about 3 mm to about 6 mm. The weight of the expanded, crispy chip-like coating may be from about 30% by weight to about 70% by weight, preferably from about 40% by weight to about 60% by weight, based upon the total weight of the expanded chip-like coating and the edible core material.

A savory or sweet snack having an expanded, crispy, chip-like textured coating is obtained by tumbling an edible core material, and alternately applying an aqueous component and a preblended dry mixture on the tumbling edible core material to form a dough coating on the edible core material. In the present invention, a substantially uniform coating of individual core material pieces is achieved without agglomeration or sticking of pieces to each other during coating and during subsequent processing steps such as frying or baking, cooling, and seasoning application.

After the tumbling and dough formation, the dough-coated core material may be heated by frying or baking to substantially reduce the moisture content of the dough, to substantially gelatinize the starch in the wheat flour component, and to substantially expand the dough. The expanded dough-coated core material may then be cooled to obtain individual pieces having a core material coated by or encased in an expanded, substantially uniform, homogeneous, cellular coating or casing which has a crispy, chip-like texture.

Edible core materials which may be coated in accordance with the present invention include nuts, whole grains, seeds, beans, dried fruits, such as raisins, dried cherries, dried cranberries, and dried pineapple, dried vegetables and legumes such as green peas, cookies, crackers, marshmallows, peanut butter, meats, ready-to-eat cereals, confectionery chips, cheese, such as high- or low-fat, unripened or ripened soft, semisoft, hard, very hard, processed, whey, and Lesion cheeses, cheese blends, and preprocessed cheese, particulates thereof and agglomerates thereof. Preferred edible core materials are nuts, such as peanuts, macadamia nuts, almonds, cashews, Brazil nuts, filberts, pecans, and walnuts. The most preferred edible core material is peanuts. The nuts which are subjected to the dough coating of the present invention may be raw, blanched, salted, oil roasted, dry roasted, or honey roasted. Most preferably, raw nuts with the skins attached are employed in the present invention. In preferred embodiments, each coated snack piece contains only a single or individual nut or other edible core piece.

In accordance with the present invention, a substantially expanded, uniform, thick, crisp, chip-like textured coating is achieved with the use of a film-forming pregelatinized waxy starch. The pregelatinized waxy starch is activated prior to heating by at least substantially hydrating it. The hydrated pregelatinized waxy starch provides an extensible surface film prior to heating, which temporarily traps moisture below the expandable film surface upon heating. A raw potato starch helps to reduce or control, or eliminate bubbling and to provide a non-flaky, crunchy, chip-like texture. It also serves to control oil pick-up or absorption during frying thereby resulting in a less greasy product.

The pregelatinized waxy starch preferably has a high degree of starch gelatinization (as measured by differential scanning calorimetry (DSC)), so that it is more readily hydrated and more readily activated prior to heating. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World*, Vol. 33, No. 3, pgs. 306-311 (March 1988). In embodiments of the present invention, the starch granules of the pregelatinized starches may be at least about 90% gelatinized, preferably at least about 95% gelatinized, most preferably completely gelatinized.

Pregelatinized waxy starches or pregelatinized high amylopectin-content starches which may be used in the present invention include pregelatinized waxy maize starch, pregelatinized waxy rice starch, pregelatinized waxy barley starch, pregelatinized waxy sorghum starch, and mixtures thereof. The preferred pregelatinized waxy starch for achieving dough cohesiveness, extensibility, and machinability, and a substantially expanded, crispy, chip-like texture is a non-modified waxy maize starch such as X-Pand'R-612 produced by A.E. Staley Manufacturing Company. The preferred pregelatinized waxy maize starch is not chemically modified nor acid hydrolyzed. The pregelatinized waxy starch preferably has a moisture content of less than or equal to about 6% by weight and a pH of about 5 to about 6. The pregelatinized waxy starch preferably provides an initial thickening, to facilitate dough formation and avoid agglomeration and stickiness during coating, followed by a significant loss in viscosity under moderate shear and temperature conditions to facilitate expansion during heating. Loss in viscosity increases the rate of heat penetration under heating or baking conditions during moisture removal. Expansion continues during moisture removal and the finished product acquires an expanded texture at moisture contents of about 1.5% by weight to about 3% by weight. The viscosity of the pregelatinized waxy starch at 5% dry solids may be at least about 1000 cps at about 85° C., with the time required to reach peak viscosity at about 85° C. being a maximum of about 3 minutes. The particle size distribution of the pregelatinized waxy starch may be less than or equal to about 20% by weight passing through a 50-mesh screen and less than or equal to about 30% passing through a 200-mesh screen. If the particle size is too small, the pregelatinized starch tends to hydrate predominately on the surface. Increasing the particle size of the pregelatinized waxy starch tends to increase its ability to form homogeneous dry blends and reduces its tendency to form lumps.

"Modified" in the starch industry is essentially a regulatory adjective that means chemically modified, rather than physically treated. Gelatinization is a physical treatment, in which no chemical bonds are destroyed or created. Chemical modification does result in actual chemical changes in the starch molecules. There are many different types of chemical modifications, but the most common chemical modification of waxy maize starch is a cross-linking reaction. Waxy starches are described as having a "long" texture when they are cooked. If the cooked starch slurry is poured from a spoon, it has a mucous appearance. By cross-linking the starch, the texture is said to become "short" because when the cooked slurry is poured from a spoon the stream breaks before it finishes falling.

The intended functionality of pregelatinized waxy maize starch for crispy coatings is to create films. To the extent that the starch is cross-linked (and to the extent that the starch contains amylose, as for normal pregelatinized corn starch), the film-form-forming functionality and expandability are decreased. A pregelatinized waxy starch which is not chemically modified provides superior functionality for film-forming and expansion to a crispy texture. A waxy starch has a very high amylopectin content and a very low amylose content. Generally, the amylose content of a waxy starch is less than about 2% by weight. Amylose-containing starches create a more leathery, crunchy texture. Wheat flour alone cannot generate the film-forming functionality needed to achieve a crispy, chip-like texture in an expanded product. The addition of a pregelatinized waxy starch which is not chemically modified provides superior film forming ability, expansion, and crispiness compared to use of a chemically-modified waxy maize starch or a pregelatinized chemically modified waxy starch.

The amount of the pregelatinized waxy starch which may be used in embodiments of the present invention may range from about 10% by weight to about 60% by weight, preferably from about 20% by weight to about 40% by weight, based upon the weight of the preblended dry mixture, or the total weight of the dry ingredients of the dough coating.

The raw potato starch which may be employed in the present invention to contribute to a crunchy, chip-like texture and to control expansion and oil absorption during frying is preferably a purified potato starch. Use of a pregelatinized potato starch, such as mashed potato flour, or use of a chemically modified potato starch would tend to reduce expansion and result in a harder texture. Exemplary of a raw potato starch which may be used is a Food Grade Quality potato starch, which is a white powder having a pH of 7, a moisture content of less than or equal to 205 mg/g, and which is insoluble in water at temperatures below 50° C., produced by Avebe America, Inc., Princeton, N.J. The amount of the raw potato starch which may be used in embodiments of the present invention may range from about 2% by weight to about 30% by weight, preferably from about 5% by weight to about 20% by weight of a raw potato starch, based upon the weight of the preblended dry mixture, or the total weight of the dry ingredients of the dough coating. Higher amounts of a raw potato starch tend to result in an irregular cell structure and an irregular texture.

The wheat flour component used in the coated snacks of the present invention may be a flour of common wheat or triticum aestivum, and/or a flour of club wheat, a pastry flour, durum wheat, graham flour or whole wheat flour, and mixtures thereof. Graham flour or whole wheat flour may be employed to enhance color and flavor, and also to control bubbling. Graham flour or whole-wheat flour tends to reduce bubbling. It is believed that large-sized particles of graham flour may interrupt film formation or provide discontinuities in the film which cause bubble breakage. Also, highly water-absorbent components, such as wheat bran, present in the graham flour may interfere with hydration of the pregelatinized waxy starch to reduce bubbling. In embodiments of the invention, whole-wheat flour or graham flour may be included in amounts which do not adversely affect a crispy, chip-like texture, for example, up to about 60% by weight, of the wheat flour component. Durum wheat generally provides a texture which is hard rather than crisp. In embodiments of the invention, durum wheat may be included in amounts which do not adversely affect texture, for example, up to about 10% by weight of the wheat flour component. Common wheat flour is preferred as the wheat flour component. The wheat flour may be from winter wheat or spring wheat, either of which may be soft or hard. The soft or hard wheats may be either red or white. Conventional wheat flours used for cracker or pastry production may be used in the present invention. The wheat flours used in the present invention are preferably not extensively bleached, because extensively bleached flours tend to produce a cake-like, non-crispy texture. The protein or gluten content of the wheat flour should be sufficient to provide a cohesive dough at temperatures of from about room temperature to about 125° F. The protein content or gluten content of the grain flours, such as wheat flour, employed in the present invention may be from about 6% by weight to about 14% by weight, preferably from about 8% by weight to about 10% by weight, based upon the total weight of the grain flours.

The wheat flour component may be used in an amount of from about 10% by weight to about 70% by weight, preferably from about 35% by weight to about 60% by weight, based upon the weight of the preblended dry mixture, or the total weight of the dry ingredients of the dough coating.

Other grain flours or non-gluten containing flours, such as rice flour, corn flour, oat flour, potato flour, peanut flour, and the like, tend to result in a less crunchy texture. They may be used in amounts to control expansion, bubble formation, or taste which do not adversely affect attainment of a crispy, crunchy texture. Exemplary amounts of non-gluten containing flours which may be used range from about 5% by weight to about 35% by weight, based upon the weight of the wheat flour component. In embodiments of the invention, the preblended dry mixture may include at least one no-gluten content flour in an amount of from about 2% by weight to about 15% by weight, based upon the weight of the preblended dry mixture, or the total weight of the dry ingredients of the dough coating.

In embodiments of the invention, a film-forming, cold-water swelling, modified waxy maize starch may be included to control expansion of the dough coating, in amounts which do not adversely affect the attainment of a crispy, chip-like texture. Exemplary of a cold water swelling, modified waxy maize starch which may be employed is Ultra-Crisp® CS, which is a fine powder having a pH of about 5 and a moisture content of about 8% by weight, produced by National Starch & Chemical, Bridewater, N.J. A cold-water swelling modified waxy starch may be employed in an of from about 2% by weight to about 25% by weight, based upon the weight of the preblended dry mixture, or the total weight of the dry ingredients of the dough coating.

In embodiments of the present invention, a starch hydrolyzate may be included in the dough coating to provide uniform expansion and to help maintain the edible core material, such as a peanut, in the center, or substantially in the center of the snack during baking and frying. The starch hydrolyzate contributes to crispness, helps to provide a continuous phase, reduces elasticity during heating and helps to prevent cracking of the expanding coating and escape of the edible core. The starch hydrolyzate may have a dextrose equivalent (DE) of about 5 to 42, preferably from about 10 to about 30. Exemplary starch hydrolyzates which may be employed are maltodextrins, corn syrup solids, and mixtures thereof. A starch hydrolyzate for use in the present invention is corn syrup solids, such as Star-Dri 240 corn syrup solids which has a maximum moisture content of 6% by weight, a DE of 22 to 30, and a pH of 4.0 to 6.5, and which is manufactured by A.E. Staley Manufacturing Company, Decatur, Ill. Exemplary amounts of the starch hydrolyzate which may be used in the production of the coated snacks of the present invention are from about 2% by weight to about 30% by weight, preferably from about 5% by weight to about 20% by weight, based upon the weight of the preblended dry mixture, or the total weight of the dry ingredients of the dough coating.

In embodiments of the invention, at least one sugar may be included in the dough coating to provide a sweet taste, control expansion, and control texture of the snack. Sugars, particularly liquid sugars, tend to reduce expansion and provide a crunchy, harder texture. The sugars employed may be mono- and/or di-saccharides, such as sucrose, fructose, lactose, dextrose, maltose, galactose, glucose syrup, invert syrup, high fructose corn syrup, molasses, brown sugar, maple syrup, mixtures thereof, and the like. The sugar may be admixed with the other ingredients in either solid or crystalline form, such as crystalline or granulated sucrose, granulated brown sugar, or crystalline fructose, or in liquid form, such as sucrose syrup or high fructose corn syrup. Use of solid or crystalline forms of sugars is preferred so as to more accurately control the composition of the dough formed on the edible core materials from batch to batch. Also, a liquid sugar or syrup tends to reduce expansion, promote a harder, less open texture, and sticks to the tumbling device to a greater extent than does a solid or crystalline sugar. Granular sugars are preferred over powdered sugars because the larger particle size reduces dissolution of the sugar makes more water available for activation of the pregelatinized waxy starch and gelatinization of the starch present in the wheat flour and other grain flours. Granulated sucrose is a preferred sugar for use in the production of sweet coated snacks. In embodiments of the present invention, savory snacks may be produced without the addition of a sugar. Exemplary amounts of sugars which may be employed in the production of sweet snacks range from about 5% by weight to about 30% by weight, for example, from about 10% by weight to about 25% by weight, based upon the weight of the preblended dry mixture, or the total weight of the dry ingredients of the dough coating.

The dough compositions of the present invention may optionally contain up to about 1% by weight, preferably up to about 0.1% by weight of a leavening system or pH-adjusting agents, based upon the weight of the preblended dry mixture, or the total weight of the dry ingredients of the dough coating. Exemplary of chemical leavening agents or pH-adjusting agents which may be used include alkaline materials and acidic materials such as sodium bicarbonate, ammonium bicarbonate, calcium acid phosphate, calcium phosphate (monobasic, monohydrate), sodium acid pyrophosphate, diammonium phosphate, tartaric acid, mixtures thereof, and the like.

In embodiments of the present invention, such as in the production of baked coated snacks, an oleaginous composition may optionally be included in the dough coating. Oleaginous compositions, which may be used may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Solid shortenings or fats in powdered form, such as Beatreme 3618, are preferred. Exemplary amounts of an oleaginous composition which may be used are up to about 20% by weight, based upon the weight of the preblended dry mixture, or the total weight of the dry ingredients of the dough coating.

In addition to the foregoing, the dough coating of the invention may include other additives conventionally employed in crackers and snacks. Such additives may include, for example, milk by-products, egg or egg by-products, cheese, cocoa, salt, monosodium glutamate, vanilla or other flavorings. For example, salt may be added to the dough in an amount of from about 1% by weight to about 4% by weight, preferably from about 2% by weight to about 3% by weight, based upon the weight of the preblended dry mixture, or the total weight of the dry ingredients of the dough coating.

The aqueous component which is sprayed onto the tumbling edible core material for forming a dough coating thereon with the preblended dry mixture may be water or an aqueous sugar solution. Although an aqueous sugar solution may be employed as a binder, pure water, is preferably utilized as the liquid binder. Use of an aqueous component which is 100% by weight water provides more accurate and consistent control of the solids content and composition of the dough coating, and product texture from batch to batch. Use of pure water also reduces sticking of sugar ingredients to the tumbling device, and avoids clogging of spray nozzles.

The amount of water added to produce the dough coatings of the present invention should be sufficient to provide a moisture content of from about 28% by weight to about 42% by weight, preferably from about 32% to about 39% by weight, based upon the weight of the dough.

Conventional snack-flavoring, -seasoning, and -coloring ingredients, odorants, condiments, confections, and mixtures thereof may be applied upon the expanded, cellular coating after baking or frying. Exemplary of such ingredients which may be used include flavorings such as the savory flavors of barbecue, sour cream, chives, onion, garlic, butter, salt, vinegar, honey mustard, ranch, bacon, chicken, beef, cheese, and ham flavorings, the sweet flavors of cinnamon and sugar, peanut butter, banana nut, apple pie, honey graham, shortbread, butter toffee, cocoa crunch, chocolate chip, honey nut, oatmeal raisin, and vanilla crunch flavorings, cookie flavors, nuts and seeds, vanilla, and chocolate products, dried vegetable flakes and herb flakes such as pepper, basil, thyme, peppermint, dried tomato, and parsley flakes, condiment flakes, fruit flakes, spices, cheese powders such as cheddar cheese and Nacho cheese seasoning powders, and mixtures thereof.

The seasonings or flavorings may be applied by coating the fried or baked pieces with an oil-based binding composition, and then applying a powdered seasoning composition to the binder coated pieces. Use of an oil-based binding composition rather than a water-based binder avoids the need for subsequent drying to obtain a shelf-stable final snack product. In embodiments of the invention, the oil-based binding composition or oil slurry may be used in an amount of from about 2% by weight to about 8% by weight, preferably from about 4% by weight to about 6% by weight, based upon the total weight of the seasoned snack, when the snack is a fried snack.

In baked varieties, the oil-based binding composition may be used in an amount up to about 20% by weight, preferably up to about 15% by weight, based upon the total weight of the seasoned snack. The powdered seasoning may be employed in an amount of from about 2% by weight to about 15% by weight, preferably from about 4% by weight to about 8% by weight, based upon the total weight of the seasoned snack.

The dough coatings may be formed on the tumbling edible cores at temperatures of less than about 125° F., preferably at about room temperature. In embodiments of the invention, the dough may be formed on the tumbling edible core material by continuously supplying the preblended dry mixture during tumbling to apply the preblended dry mixture to the tumbling edible core material, and continuously or intermittently supplying the said aqueous component during tumbling to hydrate the preblended mixture upon the edible core. In preferred embodiments, the aqueous component is intermittently supplied during the tumbling so as to provide time for at least substantial hydration of the applied preblended dry mixture before further application of the aqueous component upon the powder-coated cores. The intermittent supply of the aqueous component helps to reduce stickiness, helps to avoid washing off of the applied powder, and provides for more uniform hydration of the preblended dry mixture ingredients.

The tumbling may be performed in conventional tumbling bed coating equipment, such as pan coaters, revolving pans, or rotating drums. However, in a preferred embodiment, tumbling and dough formation is performed in a conventional belt coater which is modified for the application of the preblended dry mixture and aqueous component in accordance with the present invention. In a conventional belt coater, such as an LMC International chocolate coater, or a DT&G FINN chocolate coater, a continuous belt is employed to tumble a bed of edible cores, such as nuts, for the application of a chocolate coating. In accordance with the modifications of the present invention, both solid and aqueous liquid ingredient feeds, rather than just an oleaginous liquid feed are provided so as to enable the formation of a dough coating while edible cores are tumbled on the continuous belt. In other embodiments of the present invention, a continuous belt coater which employs separate belts and compartments, such as one manufactured by Kuipers, may be used for the continuous production of coated snacks. In the continuous belt coater, the edible cores are continuously fed at one end and are transported to successive belts to an exit end. Use of a continuous belt coating device in accordance with the present invention rather than a conventional pan or rotating drum coating device achieves higher production rates and more uniform coating of individual core material pieces without agglomeration or sticking of pieces to each other. It also avoids rolling of the pieces along the length of a continuous rotating drum and a helical travel path which tend to result in uneven coating.

Conventional heating and cooling devices, such as conventional fryers, fryer/coolers, baking ovens, rotary drum dryers, and multi-pass drier/coolers may be employed in processing of the dough-coated cores. Fryers equipped with agitators, or stirring paddles are preferred for preventing sticking of the individual dough coated cores during frying. Although the dough-coated cores initially sink in the frying oil, upon expansion they float. Accordingly, preferred fryers are equipped with product submersion means for continued, complete, more rapid frying.

Frying temperatures and times may range from about 280° F. to about 360° F. for about 5 to about 20 minutes, preferably from about 320° F. to about 340° F. for about 7 minutes to about 16 minutes. Baking temperatures and times may range from about 200° F. to about 400° F. for about 5 to about 45 minutes, preferably from about 275° F. to about 350° F. for about 10 minutes to about 25 minutes. When the dough-coated edible cores contain raw nuts, the frying and baking may be used to provide partial or complete roasting of the nuts as well as expansion and cooking of the dough coating. Shorter times may be employed for baking or frying by allowing curing time after the baking or frying to finish roasting of the nuts.

Cooling temperatures and times may be used to control the degree of roasting and to prevent over-roasting of nuts or overcooking of other edible cores. If seasoning is applied to the baked or fried pieces, cooling the pieces to a temperature of about 90° F. to about 130° F., preferably from about 100° F. to about 120° F. provides better adhesion of the seasoning. After application of the seasoning, further cooling to ambient temperature may be performed to stop further roasting or cooking of the cores. Cooling times may range from about 2 minutes to about 10 minutes, preferably from about 4 minutes to about 6 minutes.

The baking or frying substantially reduces the moisture content of the dough-coated core material so as to achieve a snack having a moisture content of less than about 2% by weight, based upon the weight of the snack. The snack products of the present invention may be packaged in polyethylene foil lined bags with a nitrogen flush. The products may exhibit an extended shelf life of at least six months, preferably at least 12 months.

Figure 3:
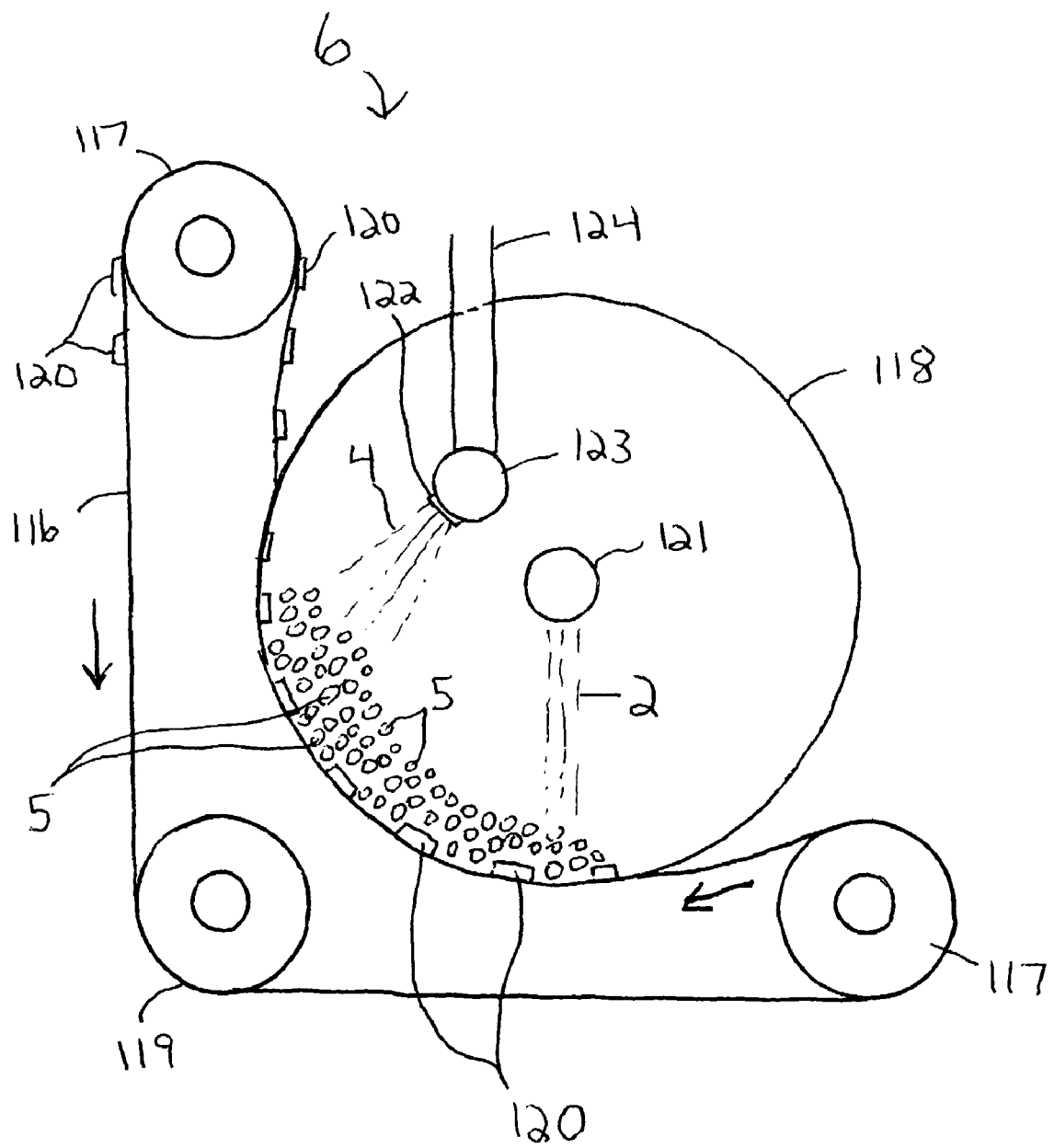
FIG. 3 is a schematic cross-sectional view of a modified semi-batch belt coater used in a method according to the present invention.
Figure 4:
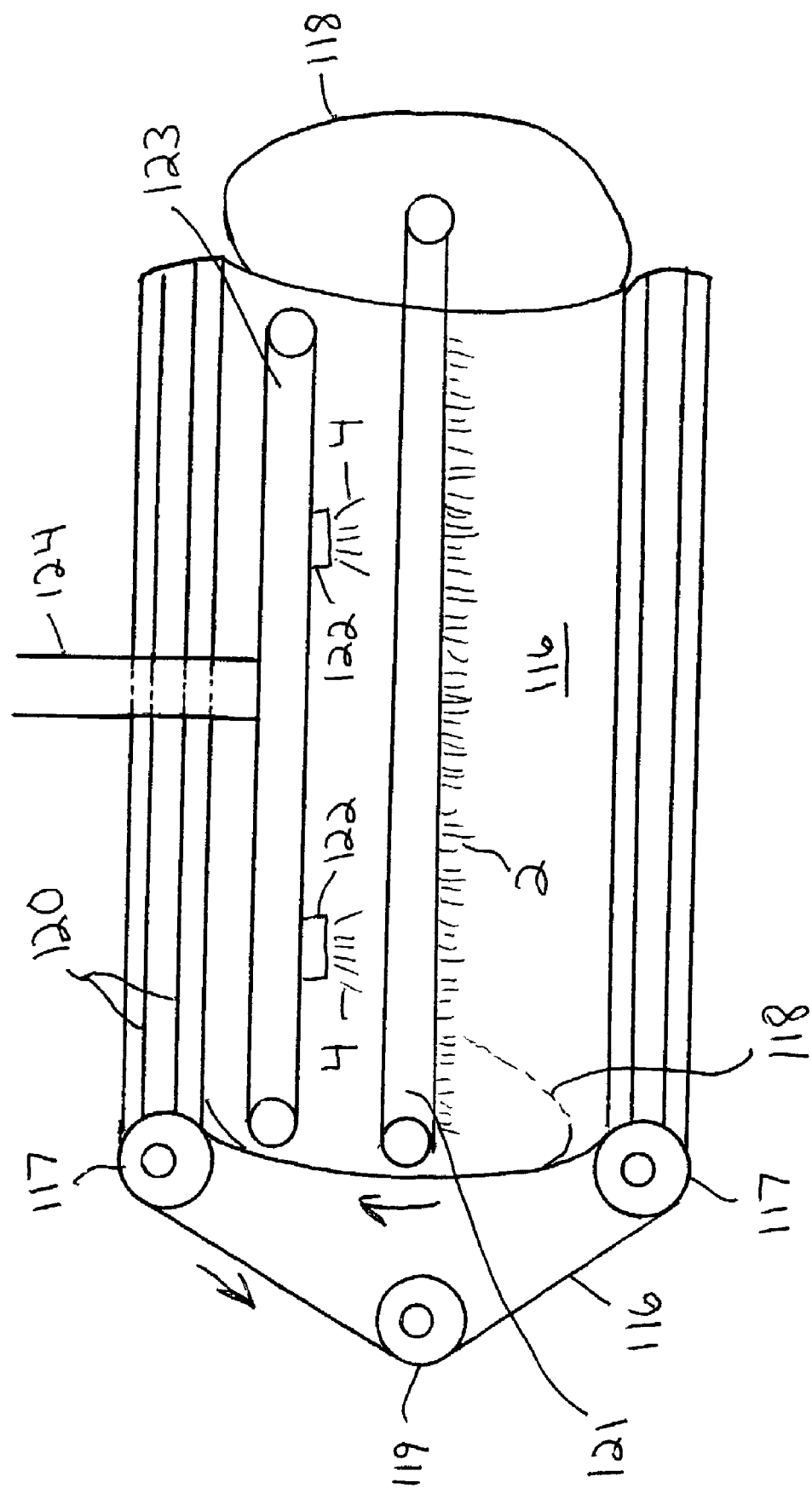
FIG. 4 is a schematic perspective view of a modified semi-batch belt coater used in a method according to the present invention.

In a method for making a fried snack as shown in FIG. 1, a mixture of dry ingredients is blended in a dry blender 1, such as a conventional Ribbon Blender. The preblended dry mixture 2 is fed to a dry feeder 3. The preblended dry mixture 2 is then separately fed along with an aqueous component 4 and an edible core material 5 to a modified semi-batch LMC belt coater 6, as shown in FIG. 3 and FIG. 4. The resulting dough-coated core material 7 is removed from the belt coater and is fed to an oil fryer/cooler 8. After frying and cooling, the expanded, dough-coated core material 9 is fed to a seasoning drum 10. A slurry 11 and a dry powdered seasoning 12 are also fed to seasoning drum 10. The seasoned, expanded, dough-coated core material 13 is then packaged.

Figure 2:
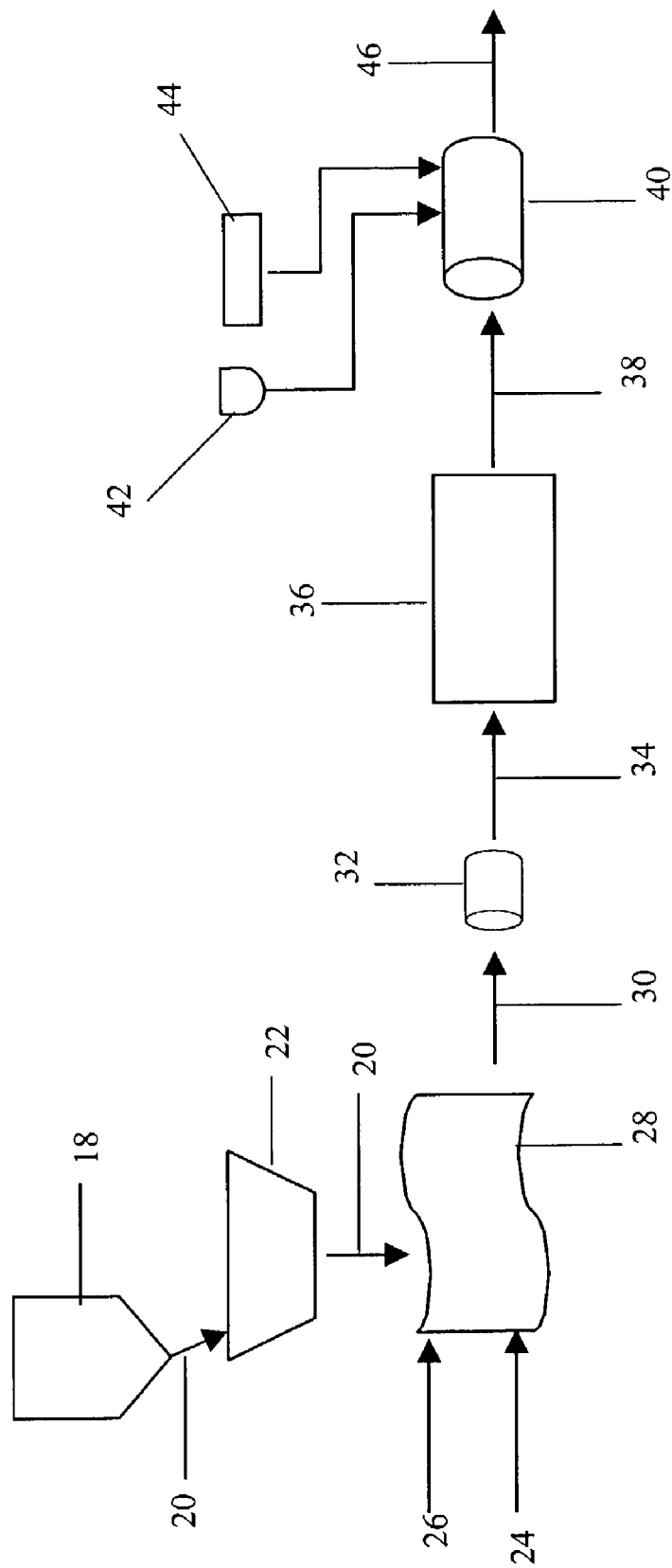
FIG. 2 schematically shows a method for making a baked, expanded, and crispy snack according to the present invention.

In a method for making a baked snack as shown in FIG. 2, a mixture of dry ingredients is blended in a dry blender 18. The preblended dry mixture 20 is fed to dry feeder 22. The preblended dry mixture 20 is separately fed along with an aqueous component 24 and an edible core material 26 to a continuous Kuipers coater 28. The resulting dough-coated core material 30 is then fed to a continuous rotary dryer 32 for pre-drying and expansion or baking. The pre-dried, baked dough-coated core material 34 is fed to a multipass drier/cooler 36 for further drying and baking or roasting. After roasting and cooling, the cooled, expanded, dough-coated core material 38 is then fed to a seasoning drum 40. A slurry 42 and a dry powdered seasoning 44 are also fed to seasoning drum 40. The seasoned, expanded, dough-coated core material 46 is then packaged.

FIG. 3 is a schematic cross-sectional view of a modified LMC belt coater 6 used according to the present invention. As shown in FIG. 3 and in the schematic, perspective view of FIG. 4, continuous belt 116 moves between rotating rollers 117. The belt 116 may be made from polypropylene and have a ribbed pattern on the surface. The belt 116 is held in place by a rotating belt guide 118 at each end or side of the belt 116 and by a rotating guide roller 119. The belt optionally has a plurality of ribs 120. The rotary motion of belt 116 causes the edible core material 5 to ride up a cylindrical inner side the belt and then tumble down towards a bottom portion of the belt.

A preblended dry mixture 2 is applied to the tumbling edible core material 5 as a curtain or sheet by pipe 121, which is positioned in the center and along the length of belt coater 3. Thus, the preblended dry mixture 2 is applied to the core material 5 in a substantially uniform manner for a substantial distance along the longitudinal axis of the belt coater 3.

In preferred embodiments of the present invention, pipe 121 includes a plurality of adjustable openings along its length for providing a substantially uniform mass flow rate of the preblended dry mixture as the curtain or sheet. The openings are preferably located or aligned substantially along the central longitudinal axis of the belt coater 3. The adjustable openings may each comprise one or more inner slots or apertures associated with an outer slot. A plurality of inner slots or apertures are associated with each outer slot. Rotation of a sleeve and its slot relative to the one or more inner slots may be used to change the width of the inner slots or apertures which are covered by the sleeve. The mass flow rate of the particulate composition through each opening may therefor be varied by rotation of the sleeve. The inner slots may be tear-drop shaped, circular, elliptical, rectangular, or square-shaped, and the like.

The inner slots are preferably located within a tubular member that includes a feed screw, helix, auger, or pigtail feeder for transporting the preblended dry mixture to the inner slots from a feeder. A feed screw transports the dry mixture through the tubular member for dispensing through the adjustable openings. The feed screw may be driven by a conventional direct or indirect motor drive. The dry feeder, drive for the feed screw, and a portion of the pipe 121 are located outside of the modified LMC belt coater 3.

An aqueous component 4 is applied to the tumbling core material 5 via a plurality of spray nozzles 122 from pipe 123, which is parallel to, positioned above, and offset from pipe 121. The spray nozzles 122 are oriented at an angle such that, during spraying, the aqueous component 4 does not substantially contact or disrupt the curtain of preblended dry mixture 2.

Pipe 121 may be a conventional spraying device equipped with nozzles 122. Conventional spray devices which may be used include airless and air-assisted airless spray devices and electrostatic spray devices. In preferred embodiments, the spray nozzles 122 provide atomization of the aqueous component or binding agent. In addition, in preferred embodiments, each atomizing nozzle 122 provides a conical spray pattern. The sprays from each nozzle 122 preferably combine into a substantially continuous longitudinal spray that descends upon the tumbling core material 5 to provide substantially uniform coating of the pieces 5. In other embodiments, the individual sprays may descend upon the pieces 5 with gaps between the sprays. The plurality of atomizing nozzles 122 may be equally spaced along the length of pipe 123. Generally, two or more atomizing nozzles 122 are spaced along pipe 123 for providing a continuous spray. The aqueous component 4 is supplied to pipe 123 by a supply line 124.

The following examples, wherein all parts, percentages, and ratios are by weight, and all temperatures are in ° F. unless indicated to the contrary, illustrate the present invention:

EXAMPLE 1

The ingredients and relative amounts which may be used for making a barbecue-flavored, fried, crispy coated savory snack are:

TABLE 1

SAVORY AND FRIED PEANUTS - BARBECUE FLAVOR

|  | wt. % | wt % Formula |
|---|---|---|
| Peanuts, raw red skin |  | 32.00 |
| Dry Coating |  |  |
| Pastry Flour | 36.49 |  |
| X-Pand'R ® 612 (A. E. Staley) | 30.00 |  |
| Raw Potato Starch (Avebe) | 10.50 |  |
| Star-Dri ® 240 (A. E. Staley) | 11.00 |  |
| Rice Flour | 10.00 |  |
| Salt | 2.00 |  |
| Baking Soda | 10.01 |  |
|  | 100.00 | 48.00 |
| average moisture after coating |  | 20.00 |
| water removal during frying (18%) |  | −18.00 |
| oil pick up during frying |  | 5.72 |
| Peanut oil, 5% base |  | 4.39 |
| KFI Barbecue Seasoning, 9% base |  | 7.89 |
|  |  | 100.00 |

Raw red skin peanuts may be tumbled in a modified, semi-batch LMC belt coater such as shown schematically in FIGS. 3 and 4. A dry coating mixture may be made by blending pastry flour (low gluten wheat flour having a protein content of about 8-9% by weight), X-Pand'R® 612 (non-modified pregelatinized waxy maize starch), raw potato starch (food grade quality), Star-Dri® 240 (corn syrup solids), rice flour, salt, and baking soda in a dry blender.

Pure water and the dry pre-blended coating mixture may be applied alternately to the peanuts in the modified LMC belt coater to coat the peanuts with the coating mixture, thereby forming a dough coating on the peanuts. The ratio of the dry preblended mixture to the peanuts may be about 40:60. After coating the peanuts, the coated peanuts may have a moisture content of about 20 wt. % based upon the weight of the dough-coated peanuts.

The dough-coated peanuts may then be fried in an oil fryer at a temperature of about 320-330° F. for about 15 minutes. The coated peanuts at first may sink in the oil, but as the dough expands, the coated peanuts float. The moisture content of the dough-coated peanuts may be substantially reduced to about 2 wt. % based on the weight of the snack. About 5.72 wt. % of oil based on the weight of the snack may picked up by the dough-coated peanuts during frying.

The expanded dough-coated peanuts may then be cooled to about 100-120° C. to obtain individual peanuts, each coated with an expanded, cellular coating that has a crispy texture.

After cooling, peanut oil and a barbecue seasoning may be applied to the peanuts in a seasoning drum.

EXAMPLE 2

The ingredients and their amounts which may be used for making a peanut butter-flavored, baked, crispy coated sweet snack are:

TABLE 2

SWEET AND BAKED PEANUTS - PEANUT BUTTER FLAVOR

|  | wt % | ratio | lbs | dry | moisture |  | % formula |
|---|---|---|---|---|---|---|---|
| Coating Operation: |  |  |  |  |  |  |  |
| Raw red skin (Jumbo Runners) |  | 50.00% | 100.00 | 93.00 | 7.00 | 100.00 | 40.05 |
| Base Coating |  |  |  |  |  |  |  |
| Pastry Flour | 35.00 |  | 35.00 |  |  | 35.00 | 14.02 |
| X-Pand'R ® 612; A. E. Staley | 25.00 |  | 25.00 |  |  | 25.00 | 10.01 |
| Powdered Brown Sugar | 16.50 |  | 16.50 |  |  | 16.50 | 6.61 |
| Dry Fat Beatreme 3618 | 15.00 |  | 15.00 |  |  | 15.00 | 6.01 |
| Peanut Flour 28% Fat LR | 5.00 |  | 5.00 |  |  | 5.00 | 2.00 |
| Flour Salt | 2.50 |  | 2.50 |  |  | 2.50 | 1.00 |
| Baking Soda | 0.50 |  | 0.50 |  |  | 0.50 | 0.20 |
| Monocalcium Phosphate (CAP) | 0.25 |  | 0.25 |  |  | 0.25 | 0.10 |
| Sodium Acid Pyrophosphate | 0.25 |  | 0.25 |  |  | 0.25 | 0.10 |
| Total | 100.00 | 50.00% | 100.00 | 89.00 | 11.00 |  |  |
|  |  | 100.00% |  |  |  |  |  |
| Water Addition |  |  | 21.95 | 0.00 | 21.95 | 21.95 | 8.79 |
| Before Roasting (18% moisture) |  |  | 221.95 | 182.00 | 39.95 |  |  |
| After Roasting (1.5% moisture) |  |  | 184.77 | 182.00 | 2.77 | −37.18 | −14.89 |
| Seasoning Application: | % |  |  |  |  |  |  |
| Coated Nuts |  | 74.00% | 184.77 |  |  |  |  |
| Slurry |  |  |  |  |  |  |  |
| Peanut Oil | 40.00 |  | 13.98 |  |  |  | 5.60 |
| Peanut Butter #3 | 25.00 |  | 8.74 |  |  |  | 3.50 |
| 10X Sugar | 29.00 |  | 10.14 |  |  |  | 4.06 |
| Flour Salt | 5.00 |  | 1.75 |  |  |  | 0.70 |

TABLE 2-continued

SWEET AND BAKED PEANUTS - PEANUT BUTTER FLAVOR

|  | wt % | ratio | lbs | dry | moisture | % formula |
|---|---|---|---|---|---|---|
| Peanut Flavor | 0.70 |  | 0.24 |  |  | 0.10 |
| Vanillin Crystals | 0.30 |  | 0.10 |  |  | 0.04 |
| Total Dry Seasoning Application | 100.00 | 14.00% | 34.96 |  | 34.96 |  |
| Powdered Brown Sugar | 50.00 |  | 14.98 |  |  | 6.00 |
| Fine Granulated Sugar | 30.00 |  | 8.99 |  |  | 3.60 |
| Peanut Flour 28% Fat LR | 20.00 |  | 5.99 |  |  | 2.40 |
| Total | 100.00 | 12.00% | 29.96 |  | 29.96 |  |
|  |  | 100.00% | 249.69 |  | 249.69 | 100.00 |

Raw red skin peanuts may be tumbled in a continuous Kuipers coater. A dry coating mixture may be made by blending pastry flour, X-Pand'R® 612, powdered brown sugar, dry fat Beatreme, peanut flour, baking soda, monocalcium phosphate, and sodium acid pyrophosphate in a dry blender.

Pure water and the dry preblended coating mixture may be applied alternately to the peanuts in the Kuipers coater to coat the peanuts with the coating mixture, thereby forming a dough coating on the peanuts. The ratio of the dry preblended mixture to the peanuts may be about 50:50. After coating the peanuts, the coated peanuts may have a moisture content of about 18 wt. % based upon the weight of the dough-coated peanuts.

The dough-coated peanuts may be subjected to pre-drying in a rotary dryer at a temperature of about 390° F. The resulting moisture content is reduced to about 5.8-7 wt. %. The dough-coated peanuts may then be baked (roasted) in an FEC multi-pass dryer (2 pass) at a temperature of about 280-300° F. for about 20-30 minutes. The moisture content of the dough-coated peanuts may be reduced to about 1.2-1.5 wt. %. The dough-coated peanuts may then be cooled to obtain individual peanuts, each having a crispy texture.

A slurry may be prepared by blending peanut oil, peanut butter, sugar, flour salt, peanut flavor, and vanillin crystals. A dry seasoning may be prepared by blending powdered brown sugar, fine granulated sugar, and peanut flour.

The slurry and the dry seasoning may be added to the roasted, expanded dough-coated peanuts in a seasoning coating drum.

EXAMPLE 3

The ingredients and their relative amounts which may be used for making a peanut butter-flavored, fried, crispy sweet snack are:

TABLE 3

SWEET AND FRIED PEANUTS - PEANUT BUTTER FLAVOR

|  | % | lbs |
|---|---|---|
| Peanuts, Raw |  | 80 |
| Coatings |  |  |
| Pastry Flour | 43.00 | 90.30 |
| Raw Potato Starch | 10.00 | 21.00 |
| X Pand'R ® 612 | 20.00 | 42.00 |

TABLE 3-continued

SWEET AND FRIED PEANUTS - PEANUT BUTTER FLAVOR

|  | % | lbs |
|---|---|---|
| Peanut Flour | 5.00 | 10.500 |
| Sugar (6X or special cut) | 20.00 | 42.000 |
| Salt | 2.00 | 4.200 |
| Total Slurry | 100.00 | 210.000 |
| Peanut Oil | 27.7 | 3.68 |
| Peanut Butter #3 | 30.1 | 4.00 |
| 10X Sugar | 34.9 | 4.64 |
| Flour Salt | 6 | 0.80 |
| Peanut Flavor | 0.8 | 0.11 |
| Vanillin Crystals | 0.38 | 0.05 |
| Total Dry Seasoning Application | 100 | 13.28 |
| Powdered Brown Sugar | 50 | 8.11 |
| Fine Granulated Sugar | 30 | 4.87 |
| Peanut Flour 28% Fat LR | 20 | 3.24 |
| Total | 100 | 16.22 |
| Coated nuts |  | 100 |

Raw red skin peanuts may be tumbled in a modified LMC belt coater, schematically shown in FIGS. 3 and 4. A dry coating mixture may be made by blending pastry flour, X-Pand'R® 612, peanut flour, sugar, and salt in a dry blender.

Pure water and the dry pre-blended coating mixture may be applied alternately to the peanuts in the modified LMC belt coater to coat the peanuts with the coating mixture, thereby forming a dough coating on the peanuts having a moisture content of about 32% by weight, based upon the weight of the dough.

The dough-coated peanuts may then be fried in an oil fryer at about 320-330° F. for about 15 minutes. The coated peanuts at first sink in the oil, but as the dough expands, the coated peanuts float. The moisture content of the dough-coated peanuts may be reduced to about 2 wt. %.

The expanded dough-coated peanuts may then be cooled to obtain individual peanuts, each coated in an expanded, cellular coating that has a crispy texture.

A slurry may be prepared by blending peanut oil, peanut butter, sugar, salt, peanut flavor, and vanillin crystals. A dry seasoning may be prepared by blending powdered brown sugar, fine granulated sugar, and peanut flour.

The slurry and the dry seasoning may be added to the roasted, dough-coated peanuts in a seasoning coating drum.

EXAMPLE 4

The ingredients and their relative amounts which may be used to make a peanut butter-flavored, fried, crispy sweet snack are:

TABLE 4

SWEET AND FRIED PEANUTS - PEANUT BUTTER FLAVOR

|  | % | lbs |
|---|---|---|
| Peanuts, Raw |  | 80 |
| Coatings |  |  |
| Pastry Flour | 28.00 | 58.80 |
| Graham flour | 15.00 | 31.50 |
| Ultra-Crisp ® CS | 20.00 | 42.00 |
| X Pand'R ® 612 | 10.00 | 21.00 |
| Peanut Flour | 5.00 | 10.50 |
| Sugar (6X or special cut) | 20.00 | 42.00 |
| Salt | 2.00 | 4.20 |
| Total | 100.00 | 210.00 |
| Slurry |  |  |
| Peanut Oil | 27.7 | 3.68 |
| Peanut Butter | 30.1 | 4.00 |
| 10X Sugar | 34.9 | 4.64 |
| Flour Salt | 6 | 0.80 |
| Peanut Flavor | 0.8 | 0.11 |
| Vanillin Crystals | 0.38 | 0.05 |
| Total | 100 | 13.28 |
| Dry Seasoning Application |  |  |
| Powdered Brown Sugar | 50 | 8.11 |
| Fine Granulated Sugar | 30 | 4.87 |
| Peanut Flour 28% Fat LR | 20 | 3.24 |
| Total | 100 | 16.22 |
| Coated nuts |  | 100 |

Raw red skin peanuts may be tumbled in a modified LMC belt coater, schematically shown in FIGS. 3 and 4. A dry coating mixture may be made by blending pastry flour, graham flour, Ultra-Crisp® CS (cold-water-swelling, modified waxy maize starch), X-Pand'R® 612, peanut flour, sugar, and salt in a dry blender.

Pure water and the dry pre-blended coating mixture may be applied alternately to the peanuts in the modified LMC belt coater to coat the peanuts with the coating mixture, thereby forming a dough coating on the peanuts having a moisture content of about 32% by weight, based upon the weight of the dough.

The dough-coated peanuts may then be fried in an oil fryer at about 320-330° F. for about 15 minutes. The coated peanuts at first sink in the oil, but as the dough expands, the coated peanuts float. The moisture content of the dough-coated peanuts may be reduced to about 2 wt. %.

The expanded dough-coated peanuts may then be cooled to obtain individual peanuts, each coated in an expanded, cellular coating that has a crispy texture.

A slurry may be prepared by blending peanut oil, peanut butter, sugar, salt, peanut flavor, and vanillin crystals. A dry seasoning may be prepared by blending powdered brown sugar, fine granulated sugar, and peanut flour.

The slurry and the dry seasoning may be added to the roasted, dough-coated peanuts in a seasoning coating drum.

What is claimed is:

1. A method for making a snack having an expanded, crispy, textured coating comprising:
    a. tumbling an edible core material in a belt coater having a solid ingredient feed, and a separate aqueous liquid ingredient feed,
    b. supplying an aqueous component to the belt coater through the aqueous liquid ingredient feed,
    c. separately and simultaneously supplying a preblended dry mixture to the belt coater through the solid ingredient feed,
    d. alternately separately applying said aqueous component from the liquid ingredient feed, and said preblended dry mixture from the solid ingredient feed onto the tumbling edible core material in said belt coater to form a dough coating on the edible core material, said preblended dry mixture comprising about 10% by weight to about 60% by weight of a pregelatinized waxy starch, about 10% by weight to about 70% by weight of a wheat flour component, and about 2% by weight to about 30% by weight of a raw potato starch which is not chemically modified, said percentages being based upon the weight of said preblended dry mixture,
    e. heating the dough-coated core material to substantially reduce the moisture content of the dough and to substantially expand the dough, and
    f. cooling the expanded dough-coated core material to obtain individual pieces having a core material coated or encased in an expanded, cellular coating which has a crispy, texture.

2. A method for making a snack as claimed in claim 1 wherein said edible core material is a member selected from the group consisting of nuts, whole grains, dried fruits, dried vegetables, cookies, crackers, marshmallows, meat, ready-to-eat cereals, confectionery chips, preprocessed cheese, and cheese.

3. A method for making a snack as claimed in claim 1 wherein said heating is by frying.

4. A method for making a snack as claimed in claim 1 wherein said edible core material is a peanut.

5. A method for making a snack as claimed in claim 1 wherein the moisture content of said dough is from about 28% by weight to about 42% by weight, based upon the weight of the dough, and said heating reduces the moisture content so as to obtain a snack having a moisture content of less than about 2% by weight, based upon the weight of the snack.

6. A method for making a snack as claimed in claim 1 wherein said aqueous component is water.

7. A method for making a snack as claimed in claim 1 wherein said core material, said preblended dry mixture, and said aqueous component are continuously supplied to said belt coater for continuously producing dough coated core material.

8. A method for making a snack as claimed in claim 1 wherein the weight of the expanded, crispy coating is from about 30% by weight to about 70% by weight, based upon the total weight of the expanded coating and the edible core material.

9. A method for making a snack as claimed in claim 6 wherein the weight of the expanded, crispy coating is from about 40% by weight to about 60% by weight, based upon the total weight of the expanded coating and the edible core material.

10. A method for making a snack as claimed in claim 1 wherein the amount of said wheat flour component is from about 35% by weight to about 60% by weight, based upon the weight of said preblended dry mixture.

11. A method for making a snack as claimed in claim 10 wherein the amount of said pregelatinized waxy starch is from about 20% by weight to about 40% by weight, based upon the weight of said preblended dry mixture.

12. A method for making a snack as claimed in claim 11 wherein the amount of said raw potato starch is from about 5% by weight to about 20% by weight, based upon the weight of said preblended dry mixture.

13. A method for making a snack as claimed in claim 1 wherein said preblended dry mixture further includes a starch hydrolyzate having a dextrose equivalent of about 5 to about 42 in an amount of from about 2% by weight to about 30% by weight, based upon the weight of said preblended dry mixture.

14. A method for making a snack as claimed in claim 13 wherein said starch hydrolyzate is corn syrup solids having a dextrose equivalent of about 22 to about 30 in an amount of from about 5% by weight to about 20% by weight, based upon the weight of said preblended dry mixture.

15. A method for making a snack as claimed in claim 14 wherein said snack is a savory snack, said heating is by frying, and a seasoning is applied to said expanded, cellular coating, said seasoning being applied by coating the fried, cooled pieces with an oil-based binding composition and then applying a powdered seasoning composition to the binder coated pieces.

16. A method for making a snack as claimed in claim 1 wherein said snack is a sweet snack, and said preblended dry mixture further includes at least one sugar in an amount of from about 10% by weight to about 25% by weight, based upon the weight of said preblended dry mixture.

17. A method for making a snack as claimed in claim 16 wherein said aqueous component is water.

18. A method for making a snack as claimed in claim 1 wherein said preblended dry mixture further includes at least one no-gluten flour in an amount of from about 2% by weight to about 15% by weight, based upon the weight of said preblended dry mixture.

19. A method for making a snack as claimed in claim 18 wherein the amount of said at least one no-gluten flour is from about 5% by weight to about 35% by weight, based upon the weight of said wheat flour component.

20. A method for making a snack as claimed in claim 18 wherein said at least one no-gluten flour comprises peanut flour.

21. A method for making a snack as claimed in claim 1 wherein said preblended dry mixture further includes a cold-water swelling, modified waxy maize starch in an amount of from about 2% by weight to about 25% by weight, based upon the weight of said preblended dry mixture.

22. A method for making a snack as claimed in claim 17 wherein said heating is by frying.

23. A method for making a snack as claimed in claim 22 wherein a seasoning is applied to said expanded, cellular coating, said seasoning being applied by coating the fried, cooled pieces with an oil-based binding composition and then applying a powdered seasoning composition to the binder coated pieces.

24. A method for making a snack as claimed in claim 1 wherein said heating is by baking.

25. A method for making a snack as claimed in claim 24 wherein said baking is performed in a rotary dryer.

26. A method for making a snack as claimed in claim 1 wherein said preblended dry mixture is continuously supplied during said tumbling to apply the preblended dry mixture to the tumbling edible core material, and said aqueous component is intermittently supplied during said tumbling so as to at least substantially hydrate said applied preblended dry mixture before further application of said aqueous component.

27. A method for making a snack having an expanded, crispy, textured coating comprising:
   a. tumbling an edible core material on a continuous belt in a belt coater,
   b. supplying an aqueous component during said tumbling through an aqueous liquid ingredient feed in the belt coater,
   c. separately and simultaneously supplying a preblended dry mixture during said tumbling through a separate solid ingredient feed in the belt coater,
   d. separately applying said aqueous component from the liquid ingredient feed, and said preblended dry mixture from the solid liquid ingredient feed, onto the edible core material while the core material tumbles on the continuous belt to form a dough coating on the edible core material and to obtain individual, free-flowing dough-coated pieces, said preblended dry mixture comprising about 10% by weight to about 60% by weight of a pregelatinized waxy starch, about 10% by weight to about 70% by weight of a wheat flour component, and about 2% by weight to about 30% by weight of a raw potato starch which is not chemically modified, said percentages being based upon the weight of said preblended dry mixture,
   e. removing the dough-coated pieces from the continuous belt,
   f. heating the dough-coated pieces to substantially reduce the moisture content of the dough and to substantially expand the dough, and
   g. cooling the expanded dough-coated core material to obtain individual pieces having a core material coated or encased in an expanded, cellular coating which has a crispy, texture.

28. A method for making a snack as claimed in claim 27 wherein said aqueous component and said preblended dry mixture are applied in curtains along the width of said continuous belt.

29. A method for making a snack as claimed in claim 28 wherein said preblended dry mixture is continuously supplied during said tumbling to apply the preblended dry mixture to the tumbling edible core material, and said aqueous component is intermittently supplied during said tumbling so as to at least substantially hydrate said applied preblended dry mixture before further application of said aqueous component.

30. A method for making a snack as claimed in claim 29 wherein said edible core material is peanuts and said aqueous component is water.

31. A method for making a snack as claimed in claim 27 wherein said snack is a sweet snack, said preblended dry mixture further comprising at least one sugar in an amount of from about 5% by weight to about 30% by weight, said percentages being based upon the weight of said preblended dry mixture.

32. A method for making a snack as claimed in claim 31 wherein said at least one sugar comprises granulated sucrose.

33. A method for making a snack as claimed in claim 32 wherein said preblended dry mixture further includes a cold-water swelling, modified waxy maize starch in an amount of from about 2% by weight to about 25% by weight, based upon the weight of said preblended dry mixture.

34. A method as claimed in claim 1 wherein said belt coater comprises a continuous belt which moves between rotating rollers, said belt being held in place by a rotating belt guide at each end or side of the belt and by a rotating guide roller, wherein rotary motion of the belt causes the edible core material to ride up a cylindrical inner side of the belt and then tumble down towards a bottom portion of the belt, said preblended dry mixture being applied to the tumbling edible core material as a curtain or sheet a substantial distance along the longitudinal axis of the belt coater, and said aqueous component being applied to the tumbling core material via a plurality of spray nozzles.

35. A method as claimed in claim 34 wherein said preblended dry mixture is supplied through a tubular member having a plurality of adjustable openings along its length for providing a substantially uniform mass flow rate of the preblended dry mixture as the curtain or sheet, the openings being located or aligned substantially along a central longitudinal axis of the belt coater, the adjustable openings each comprising one or more inner slots or apertures associated with an outer slot.

36. A method as claimed in claim 35 wherein said spray nozzles are oriented at an angle such that, during spraying, the aqueous component does not substantially contact or disrupt the curtain of preblended dry mixture.

37. A method as claimed in claim 27 wherein said continuous belt moves between rotating rollers, said belt being held in place by a rotating belt guide at each end or side of the belt and by a rotating guide roller, wherein rotary motion of the belt causes the edible core material to ride up a cylindrical inner side of the belt and then tumble down towards a bottom portion of the belt, said preblended dry mixture being applied to the tumbling edible core material as a curtain or sheet a substantial distance along the belt, and said aqueous component being applied to the tumbling core material via a plurality of spray nozzles.

38. A method as claimed in claim 37 wherein said preblended dry mixture is supplied through a tubular member having a plurality of adjustable openings along its length for providing a substantially uniform mass flow rate of the preblended dry mixture as the curtain or sheet, the adjustable openings each comprising one or more inner slots or apertures associated with an outer slot.

39. A method as claimed in claim 38 wherein said spray nozzles are oriented at an angle such that, during spraying, the aqueous component does not substantially contact or disrupt the curtain of preblended dry mixture.

40. A method as claimed in claim 1 wherein said pregelatinized waxy starch is a pregelatinized waxy maize starch which is not chemically modified nor acid hydrolyzed, and the dough is expanded to obtain a cellular, expanded snack coating which exhibits a breaking force of about 1500 gm to about 3000 gm as measured by a texture meter having a 1.6 mm probe.

41. A method as claimed in claim 27 wherein said pregelatinized waxy starch is a pregelatinized waxy maize starch which is not chemically modified nor acid hydrolyzed, and the dough is expanded to obtain a cellular, expanded snack coating which exhibits a breaking force of about 1500 gm to about 3000 gm as measured by a texture meter having a 1.6 mm probe.

* * * * *

UNITED STATES PATENT AND TRADEMARK OFFICE
CERTIFICATE OF CORRECTION

| | | |
|---|---|---|
| PATENT NO. | : 7,867,537 B2 | Page 1 of 1 |
| APPLICATION NO. | : 10/264561 | |
| DATED | : January 11, 2011 | |
| INVENTOR(S) | : Karwowski et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1512 days.

Signed and Sealed this
Seventh Day of June, 2011

David J. Kappos
*Director of the United States Patent and Trademark Office*